A. W. POOLE.
ADJUSTABLE HEAD FOR PLOWS.
APPLICATION FILED DEC. 26, 1913.
1,099,516.
Patented June 9, 1914.
2 SHEETS—SHEET 1.
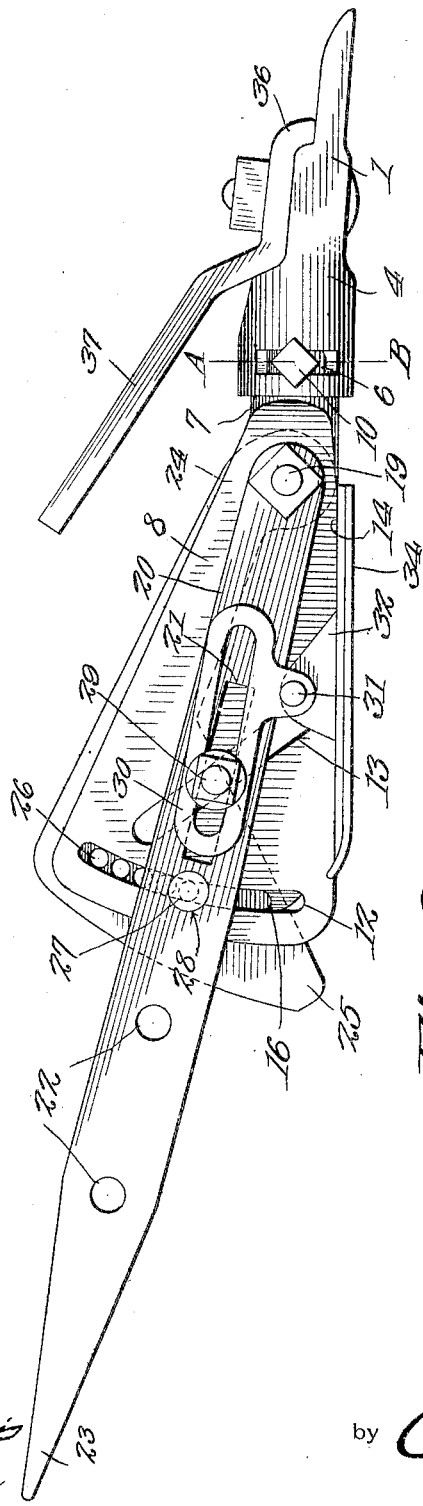
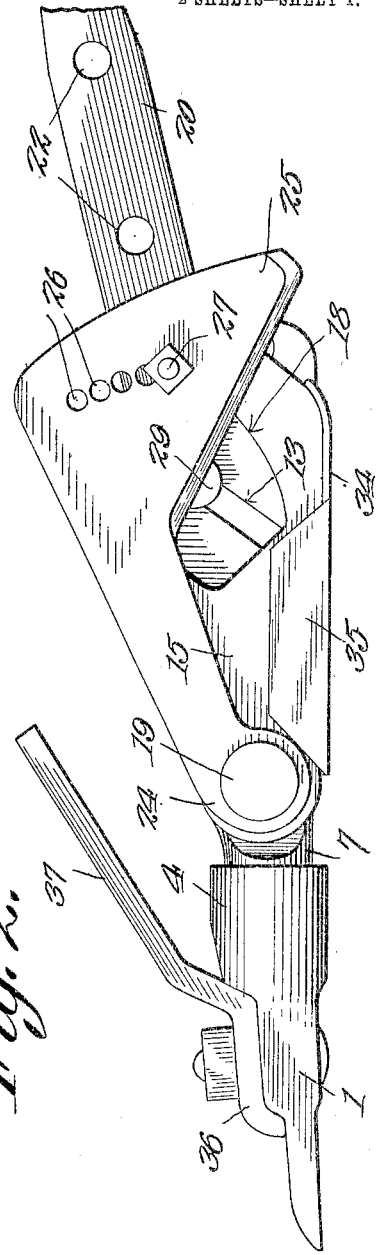
A. W. Poole
Inventor.

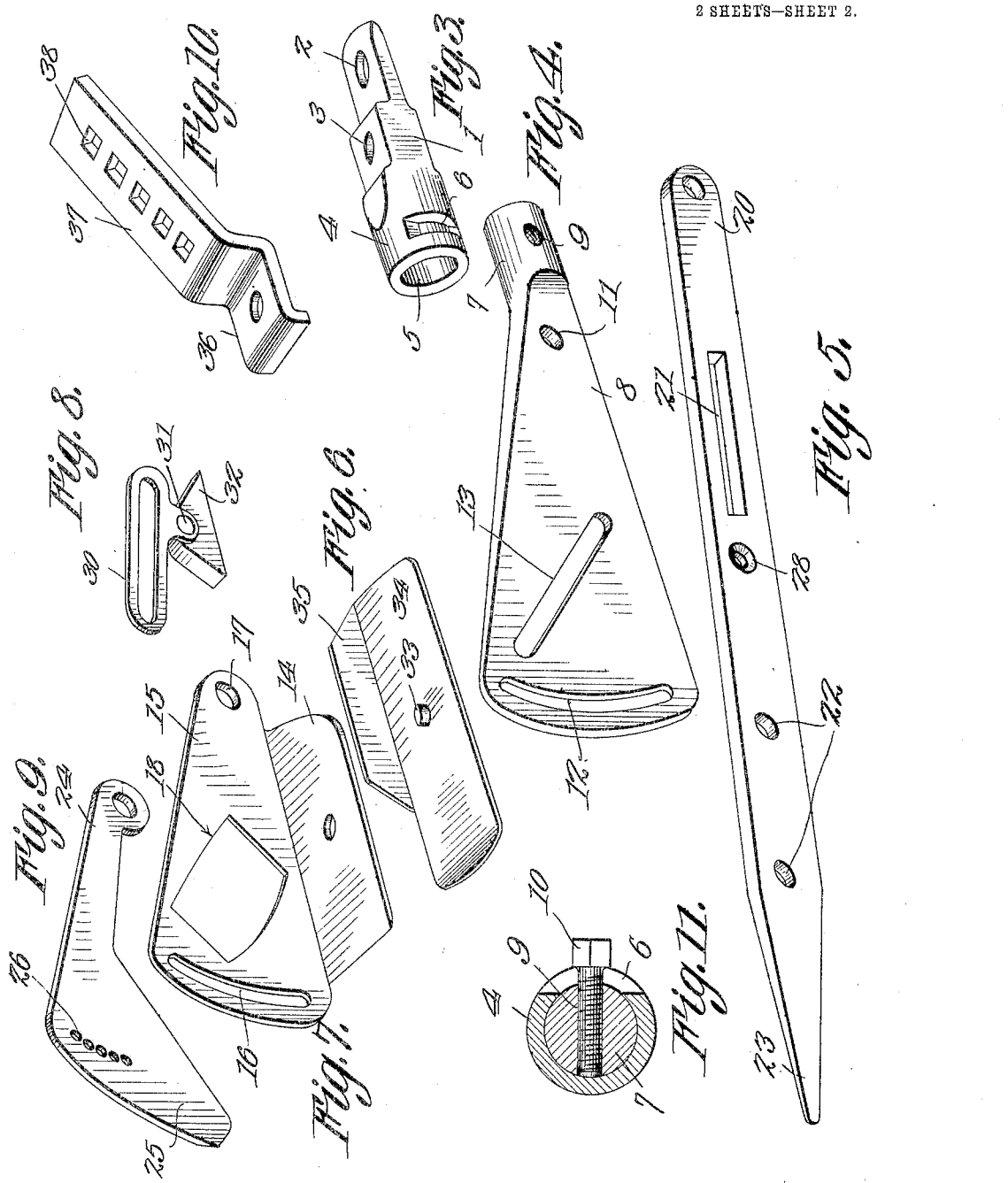

UNITED STATES PATENT OFFICE.

ALFRED W. POOLE, OF COVINA, CALIFORNIA.

ADJUSTABLE HEAD FOR PLOWS.

1,099,516.  Specification of Letters Patent.  Patented June 9, 1914.

Application filed December 26, 1913. Serial No. 808,892.

*To all whom it may concern:*

Be it known that I, ALFRED W. POOLE, a citizen of the United States, residing at Covina, in the county of Los Angeles and State of California, have invented a new and useful Adjustable Head for Plows, of which the following is a specification.

This invention relates to plows and more particularly to adjustable means whereby different forms of blades for plowing and hoeing can be attached and held at desired angles to the ground.

A further object is to provide an adjustable blade supporting head of this type having a landside and shoe adjustably connected thereto and also having adjustably connected to it means whereby either a handle or a standard can be connected to the head, thus to adapt the said plow for use either with a draft animal or as a hand plow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the plow head. Fig. 2 is an elevation showing the opposite side of the head. Fig. 3 is a perspective view of the blade engaging point. Fig. 4 is a perspective view of the shank for use in connection with the point. Fig. 5 is a perspective view of the handle or standard engaging stem. Fig. 6 is a perspective view of the combined wear plate and landside. Fig. 7 is a perspective view of the shoe and its side plate. Fig. 8 is a perspective view of the link and block used for connecting the shoe and wear plate to the shank. Fig. 9 is a perspective view of the colter used for holding the plow in line. Fig. 10 is a perspective view of a supplemental support for use upon the point. Fig. 11 is an enlarged section on line A—B Fig. 1.

Referring to the figures by characters of reference 1 designates a stepped point having openings 2 and 3 therein for the reception of bolts designed to secure blades of different types upon the point. The back end of the point is enlarged as shown at 4 and provided with an end socket 5, there being a slot 6 in one side of the enlargement. The rounded end 7 of a flat substantially triangular shank 8 is adapted to be inserted into the socket 5 and to be adjusted angularly therein, there being a threaded opening 9 within the portion 7 for the reception of a binding screw 10, whereby the shank can be held against movement after being rotated to any desired position within the socket 5.

The triangular shank 8 has its apex portion provided with an opening 11 while formed within the wide end portion of the shank is an arcuate slot 12 concentric with the opening 11. Another oblique slot 13 is formed in the shank and is inclined upwardly and rearwardly toward the upper end of the slot 12.

The shank 8 is adapted to extend over a plate 14 constituting a shoe, this plate being provided, at one side, with an upwardly extending segmental side plate 15 provided, at its rear or wide end with an arcuate slot 16 similar to the slot 12 and, at its forward or apex portion with an aperture 17 similar to the opening 11. A large opening 18 is formed in the plate 15 and at one side of the slot 13.

A bolt 19 is extended through the openings 11 and 17 and one end of the bolt is engaged by a stem 20 shown in detail in Fig. 5. This stem has a longitudinal slot 21 adapted to extend across the diagonal slot 13 and is also provided with apertures 22 whereby, should the stem be used in connection with a plow standard, the same can be readily bolted or otherwise secured thereto. As shown in the drawings the free end of the stem is preferably pointed, as at 23 so as thus to be driven readily into a wooden handle where the structure is to be used as a hand plow or hoe. The other end of the bolt 19 is pivotally engaged by an arm 24 extending from a colter blade 25 which extends downwardly and rearwardly from the arm and has an arcuate series of apertures 26, any one of which is adapted to receive a bolt 27 inserted through an opening 28 in the stem 20 and through the arcuate slots 12 and 16. It will be apparent that by loosening this bolt 27, the stem 20 can be adjusted angularly about the bolt 19, inasmuch as said bolt 27 is free to slide within the slots 12 and 16 when the bolt is loosened. After the stem has been adjusted to a desired position, the bolt 27 can be tightened, thus clamping the parts 20, 8, 15 and 25 tightly together. By inserting the bolt into different apertures 26, the colter 25 can be adjusted angularly about the bolt 19 independently of the stem 20. As a further means for holding the stem 20 against movement relative to the shank 8, a bolt 29 is extended through slots 13 and 21, the head of the bolt being disposed within the enlarged opening 18.

For the purpose of adjusting the shoe 14 relative to the shank 8, a link 30 is mounted on the bolt 29 and has a depending ear 31 to which is pivotally connected a triangular block 32. This block bears upon the shoe 14 and is adapted to be engaged by a lug 33 extending upwardly through the shoe 14 and from a wear plate 34. This wear plate is arranged under the shoe 14 and has a side flange 35 constituting a part of a landside, the said flange lapping the plate 15 which serves as a continuation of the landside. Obviously, when the bolt 29 is loosened, the link 30 can be adjusted thereon so as to press downwardly on the shoe 14 or pull upwardly thereupon, thus to change the position of the shoe relative to the lower edge of the shank 8.

As before stated, blades of different types can be attached directly to the stepped point 1 but, if desired, the said point may be provided with an extension such as shown in detail in Fig. 10 and which includes a stepped base 36 adapted to be secured upon the point 1 and having an inclined tongue 37 provided with a series of openings 38. This device, when in position on the point, as shown in Figs. 1 and 2, is adapted to support blades of different kinds at greater angles to the surface of the ground than would be possible should the blades rest directly on the stepped top of the point 1.

It has been found in actual practice that a head such as herein described is capable of use with a large variety of plow blades, hoes and the like, this being due to the fact that the various parts can be adjusted to different positions relative to each other, the adjustment being readily effected. It is also important to note that the structure can be used either in connection with an ordinary wooden handle adapted to be driven onto the point of the stem 20 or in connection with a standard which can be bolted to the stem and which will curve upwardly and forwardly over the head as ordinarily.

What is claimed is:—

1. A plow head including a point having a socket, a shank having an end portion extending into and adjustable angularly within the socket, said shank being substantially segmental, means for holding the shank against movement relative to the point, a shoe, a side plate thereon and extending to one side of the shank, a wear plate extending under the shoe and having a side flange lapping said plate coöperating therewith to form a landside, a stem connected to and adjustable angularly relative to the shank, said side plate being also adjustable angularly relative to the shank, and means extending through the shank, side plate and stem for binding them together and holding them against angular movement relative to each other.

2. A device of the class described including a point having a socket, a flat segmental shank adjustably connected to the point, a pivot bolt extending through one end portion of the shank, a stem mounted on the bolt, at one side of the shank, a side plate mounted on the bolt at the other side of the shank, a shoe integral with the side plate and extending under the shank, said plate being independently adjustable angularly about the bolt, means extending through the plate, shank and stem for holding the same against relative movement, there being slots within the shank and stem and adapted to cross, a clamping bolt extending through the crossed slots, and an adjustable connection between said bolt and shoe.

3. A device of the class described including a point having a socket, a flat segmental shank adjustably connected to the point, a pivot bolt extending through one end portion of the shank, a stem mounted on the bolt, at one side of the shank, a side plate mounted on the bolt at the other side of the shank, a shoe integral with the side plate and extending under the shank, said plate being independently adjustable angularly about the bolt, means extending through the plate, shank and stem for holding the same against relative movement, there being slots within the shank and stem and adapted to cross, a clamping bolt extending through the crossed slots, and an adjustable connection between said bolt and shoe, said connection including a link and a block pivotally connected to the link and secured to the shoe, said link being slidably and pivotally mounted on the bolt.

4. In a device of the class described, the combination with a point and a flat segmental shank connected thereto, of a pivot bolt extending through one end portion of the shank, a stem adjustable angularly on the bolt at one side of the shank, a side plate adjustable angularly on the bolt at the other side of the shank, a shoe integral with the side plate and extending under the shank, an arm adjustable angularly on the bolt and at one side of the plate, a collar blade depending from the arm, and a bolt extending from the stem and through the shank, side plate and colter blade, said shank, side plate and colter blade being adjustable independently of each other upon the bolt and said means constituting means for holding them against relative movement subsequent to adjustment.

5. In a device of the class described the combination with a point, a shank adjustably connected thereto, and a toothed bolt extending through one end portion of the shank, of a stem at one side of the shank and mounted on the bolt, a plate at the other side of the shank and mounted on said bolt, a shoe extending from the plate and under the shank, a wear plate connected to the shoe, an arm mounted on said bolt, a colter blade extending from the arm, a clamping bolt extending from the stem and through the shank, plate and colter blade, there being arcuate slots within the shank and plate for the reception of the bolt and an arcuate series of apertures in the colter blade for the reception of the bolt, said bolt, when tightened, constituting means for holding the colter blade, plate and shank against movement relative to each other and to the stem.

6. In a device of the class described, the combination with a stepped point and a shank extending therefrom, of a support including a stepped base detachably secured upon the stepped portion of the point, and an upwardly and rearwardly inclined tongue.

In testimony that I claim the foregoing as my own, I have hereto affixed my signature in the presence of two witnesses.

ALFRED W. POOLE.

Witnesses:
F. W. GAIL,
A. M. PANCE.

---

Copies of this patent may be obtained for five cents each, by addressing the "Commissioner of Patents, Washington, D. C."